United States Patent [19]

Fewkes, Jr.

[11] Patent Number: 5,043,414

[45] Date of Patent: Aug. 27, 1991

[54] ALKYLPEROXYFORMATE-TERMINATED POLYCARBONATE

[75] Inventor: Edward J. Fewkes, Jr., Galway, N.Y.

[73] Assignee: General Electric Company, Schenectady, N.Y.

[21] Appl. No.: 399,650

[22] Filed: Aug. 28, 1989

[51] Int. Cl.$^5$ .............................................. C08G 64/14
[52] U.S. Cl. .................................... 528/198; 528/196; 528/481; 528/502; 528/503
[58] Field of Search ................................ 528/198, 196

[56] References Cited

U.S. PATENT DOCUMENTS 4,446,296  5/1984  Rosenquist ........................... 528/198
4,864,011  9/1989  Bussink et al. ....................... 528/198

OTHER PUBLICATIONS

Condensed Chemical Dictionary, Eighth Edition, 1971, p. 448.
Grant & Hackh's Chemical Dictionary, Fifth Edition, p. 462, 1987.

Primary Examiner—Harold D. Anderson
Attorney, Agent, or Firm—William H. Pittman; James C. Davis, Jr.

[57] ABSTRACT

Alkylperoxyformate-terminated polycarbonates are prepared by the reaction of an aromatic dihydroxy compound, preferably a bisphenol, with phosgene in one or two steps, in the presence of an alkyl hydroperoxide such as t-butyl or 2-phenyl-2-propyl hydroperoxide. The alkylperoxyformate-terminated polycarbonates may be converted to hydroxy-terminated polycarbonates by heating in the melt.

15 Claims, No Drawings

ALKYLPEROXYFORMATE-TERMINATED POLYCARBONATE

This invention relates to hydroxy-terminated polycarbonates and intermediates for their preparation. More particularly, it relates to the preparation of hydroxy-terminated polycarbonates from polycarbonates having terminal alkylperoxyformate groups.

Polycarbonates are highly regarded engineering resins because of their excellent physical properties. For example, aromatic polycarbonates exhibit high tensile and impact strengths as well as good thermal stability. However, the use of polycarbonates in some applications such as automotive is limited because of their poor resistance to various chemicals including organic solvents.

One potential method of improving such properties as solvent resistance in polycarbonates is by blending them with other polymers which have this property, such as polyamides. However, the resulting blends are usually deficient by reason of the incompatibility of polycarbonates and polyamides. Blends of polycarbonate and polyamides can, however, be compatibilized by incorporating therein a polyamide-polycarbonate copolymer. The same type of compatibilization is also successful with other types of polymers which are otherwise incompatible with polycarbonates.

In order to form a polycarbonate copolymer, it is necessary for functional groups which will react with the other polymer to be present on the polycarbonate. Thus, for example, U.S. Pat. No. 4,732,934 discloses polycarbonates with carboxy end groups, typically formed by the reaction of a hydroxy-terminated polycarbonate with a reagent such as trimellitic anhydride acid chloride ("TAAC"). The preparation of such functionalized polycarbonates thus necessitates the use of a hydroxy-terminated polycarbonate as an intermediate.

In theory, hydroxy-terminated polycarbonates can be prepared by conventional polycarbonate-forming reactions between bisphenols and a carbonate source such as phosgene. However, this is actually impracticable since hydroxy end groups can arise only in the absence of conventional chain termination agents (hereinafter sometimes "chainstoppers") such as phenol. Elimination of the chainstopper results in the formation of a high molecular weight, intractable polycarbonate.

The preparation of hydroxy-terminated polycarbonates of controlled molecular weight has been achieved by the use of chainstoppers such as bisphenol A tetrahydropyranyl ether or salts thereof, as disclosed, for example, in U.S. Pat. No. 4,736,013. The tetrahydropyranyl group is then removed by treatment of the polycarbonate with an acid. It will be apparent, however, that this method of preparation is often disadvantageous because of the requirement of an extra step (acid treatment) performed on a solution of the polycarbonate in an organic solvent. It would be preferable to devise a method for hydroxy-termination which does not require the introduction of additional operations into a normal polycarbonate formation operation.

It has now been discovered that the use as chainstopping reagents of various organic hydroperoxides results in the formation of novel alkylperoxyformate-terminated polycarbonates. The latter are in turn converted upon simple heating in the melt to hydroxy-terminated polycarbonates. No additional operations are required.

Accordingly, one aspect of the present invention is alkylperoxyformate-terminated polycarbonates characterized by the presence of end groups having the formula

wherein $A^1$ is a divalent aliphatic, alicyclic or aromatic radical and R is a tertiary aliphatic or alicyclic radical.

Other than in their end group structure, the polycarbonates of the present invention are conventional. Thus, they may be considered as comprising structural units of the formula

 (II)

wherein $A^1$ is as previously defined. Most often, $A^1$ is an aromatic radical, particularly a radical having the formula $$-A^2-Y-A^3-  \qquad (III)$$

wherein each of $A^2$ and $A^3$ is a monocyclic divalent aromatic radical and Y is a bridging radical in which one or two atoms separate $A^2$ from $A^3$. The free valence bonds in formula III are usually in the meta or para positions of $A^1$ and $A^2$ is relation to Y.

The $A^2$ and $A^3$ values may be unsubstituted phenylene or substituted derivatives thereof. Unsubstituted phenylene radicals are preferred. Both $A^2$ and $A^3$ are preferably p-phenylene, although both may be o- or m-phenylene or one o-or m-phenylene and the other p-phenylene.

The bridging radical, Y, is one in which one or two atoms, preferably one, separate $A^2$ from $A^3$. It is most often a hydrocarbon radical and particularly a saturated $C_{1-12}$ aliphatic or alicyclic radical such as methylene, cyclohexylmethylene, [2.2.1]bicycloheptylmethylene, ethylene, ethylidene, 2,2-propylidene, 1,1-(2,2-dimethylpropylidene), cyclo-hexylidene, cyclopentadecylidene, cyclododecylidene or 2,2-adamantylidene, especially an alkylidene radical. Arylsubstituted radicals are included, as are unsaturated radicals and radicals containing atoms other than carbon and hydrogen; e.g., oxy groups. Substituents may be present on the aliphatic, alicyclic and aromatic portions of the Y group.

Both homopolycarbonates and copolycarbonates may be employed, as well as copolyestercarbonates. Most preferably, they are bisphenol A homo- and copolycarbonates, in which, in at least a portion of the structural units, each of $A^2$ and $A^3$ is p-phenylene and Y is isopropylidene. The bisphenol A homopolycarbonates are often especially preferred by reason of their availability and excellent properties.

The end groups of the polycarbonates of this invention have formula I. In that formula, R is a tertiary aliphatic or alicyclic radical which may, however, contain aromatic substituents. It is most often aliphatic and typically contains about 4–10 carbon atoms. The t-butyl and 2-phenyl-2-propyl radicals are often preferred by reason of the availability and relative inexpensiveness of the necessary reagents (hydroperoxides) containing said radicals.

The alkylperoxyformate-terminated polycarbonates of this invention may be prepared by the reaction of an organic dihydroxy compound, preferably a dihydroxyaromatic compound such as a bisphenol, with phosgene in the presence of an alkyl hydroperoxide of the formula ROOH, wherein R is as previously defined, as a chainstopper. This method is another aspect of the invention.

Preparation of the peroxide-terminated polycarbonate is ordinarily most conveniently conducted under conventional interfacial conditions, employing as an organic solvent a substantially water-immiscible liquid such as methylene chloride. Said reaction occurs in an alkaline medium, in the presence of a tertiary amine such as triethylamine as catalyst. It may be conducted in one step, employing phosgene in combination with the dihydroxy compound and the alkyl hydroperoxide. It is often preferred, however, to first prepare a bischloroformate oligomer composition by reaction of the bisphenol with phosgene under alkaline conditions, and subsequently to add the catalyst and convert said bischloroformate composition to a polycarbonate, as described, for example, in U.S. Pat. Nos. 4,737,573 and 4,743,676, the disclosures of which are incorporated by reference herein. Introduction of the chainstopper prior to conversion to the polycarbonate, as disclosed in the aforementioned U.S. Pat. No. 4,743,676, is often particularly preferred.

The proportion of chainstopper is selected so as to produce a polycarbonate of the desired molecular weight, and can be readily determined on that basis by routine experimentation. It is usually found that somewhat higher proportions of alkyl hydroperoxide must be employed to produce a polycarbonate of a specific molecular weight than is the case with conventional chainstoppers such as phenols. Thus, about 1-10 and preferably about 2-8 mole percent of alkyl hydroperoxide, based on bisphenol, is generally employed.

The preparation of the alkylperoxyformate-terminated polycarbonates of this invention is illustrated by the following examples.

EXAMPLE 1

A 500-ml. Morton flask fitted with a phosgene dip tube, an overhead stirrer, a Friedrich condenser, a 50-ml. pressure equalizing addition funnel and a pH probe was charged with 3.01 grams (56 mmol.) of bisphenol A, 60 ml. of water and 100 ml. of methylene chloride, and the pH thereof was adjusted to between 9 and 10 by the addition of 50% aqueous sodium hydroxide solution. Phosgene was added at the rate of 0.32 grams per minute, with stirring, as the pH was maintained at 9.5-10.0 by addition of sodium hydroxide solution as necessary. Phosgene addition was stopped after 20 minutes and the mixture was sparged with nitrogen and stirred for 5 minutes after nitrogen sparging ceased.

There was then added 252 mg. (2.8 mmol.) of t-butyl hydroperoxide, and stirring was continued for another 30 minutes. After the addition of 1 ml. of 0.56 M triethylamine solution in methylene chloride, phosgene addition at 0.32 gram per minute was resumed for 10 minutes, with maintenance of the pH in the range of 9.0-9.5. The mixture was again sparged with nitrogen for 5 minutes and was allowed to stand until a negative reading was obtained with phosgene detection paper. The organic layer was separated, washed three times with aqueous hydrochloric acid solution and once with deionized water (whereupon a negative chloride test was obtained with silver nitrate) and poured into acetone in a blender. The desired alkylperoxyformate-terminated polycarbonate precipitated as a white powder and was removed by vacuum filtration and dried for 60 hours in a vacuum oven at 45° C. It was shown to have the desired molecular structure by proton nuclear magnetic resonance and Fourier transform infrared spectroscopy. Gel permeation chromatographic analysis showed the product to have a weight average molecular weight of 51,700 and a number average molecular weight of 33,500.

EXAMPLE 2

The procedure of Example 1 was repeated, substituting cumene hydroperoxide (i.e., 2-phenyl-2-propyl hydroperoxide) on an equimolar basis for the t-butyl hydroperoxide. The product had a weight average molecular weight of 84,000.

The alkylperoxyformate-terminated polycarbonates of this invention may be converted to hydroxy-terminated polycarbonates by heating in the melt, typically at temperatures in the range of about 200°-300° C. This method of conversion is another aspect of the invention.

The conversion reaction may be conducted under any conditions typical of melt polymer reactions. It inherently occurs when the polycarbonate is extruded, as is routine prior to pelletization. Therefore, extrusion is a convenient and common means for achieving conversion to the hydroxy-terminated polycarbonate.

The precise mechanism of conversion of the alkylperoxyformate-terminated polycarbonate to the hydroxy-terminated species is not known with certainty. Most likely, it is a simple Criegee rearrangement which occurs in the presence of water, generally present in the required traces as a result of isolation of the polycarbonate from a partially aqueous mixture. The sequence of reactions which occurs as a result of the Criegee rearrangement, illustrated for the t-butylperoxyformate-terminated species, is as follows, where PC represents the polycarbonate chain:

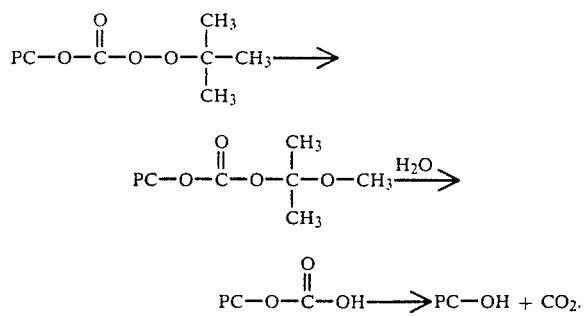

The conversion of alkylperoxyformate-terminated polycarbonates to the corresponding hydroxy-terminated species is illustrated by the following example.

EXAMPLE 3

A sample of the product of Example 1 was extruded into pellets on a twin screw extruder at a screw speed of 400 rpm. and temperatures in the range of 120°-275° C. The resulting clear yellow pellets were shown by Fourier transform infrared spectroscopy to have a hydroxy content of 0.135% by weight. The weight average molecular weight was 44,700 and the number average molecular weight was 13,700.

What is claimed is:

1. An alkylperoxyformate-terminated polycarbonate characterized by the presence of end groups having the formula $$-O-\overset{O}{\underset{\|}{C}}-O-A^1-O-\overset{O}{\underset{\|}{C}}-O-O-R,$$

wherein $A^1$ is a divalent aliphatic, alicyclic or aromatic radical and R is a tertiary aliphatic or alicyclic radical.

2. A polycarbonate according to claim 1 wherein $A^1$ is an aromatic hydrocarbon radical.

3. A polycarbonate according to claim 2 wherein $R^1$ is t-butyl or 2-phenyl-2-propyl.

4. A polycarbonate according to claim 3 wherein $A^1$ has the formula $$-A^2-Y-A^3- \qquad (III)$$

wherein each of $A^2$ and $A^3$ is a monocyclic divalent aromatic radical and Y is a bridging radical in which one or two atoms separate $A^2$ from $A^3$.

5. A polycarbonate according to claim 4 wherein each of $A^2$ and $A^3$ is p-phenylene and Y is isopropylidene.

6. A polycarbonate according to claim 5 which is a bisphenol A homopolycarbonate.

7. A method for preparing an alkylperoxyformate-terminated polycarbonate which comprises effecting reaction between an organic dihydroxy compound and phosgene in the presence of an alkyl hydroperoxide of the formula ROOH as a chain terminations agent, wherein R is a tertiary aliphatic or alicyclic radical.

8. A method according to claim 7 wherein the dihydroxy compound is a dihydroxyaromatic compound.

9. A method according to claim 8 wherein R is t-butyl or 2-phenyl-2-propyl.

10. A method according to claim 9 wherein the dihydroxyaromatic compound has the formula $$HO-A^2-Y-A^3-OH,$$

wherein each of $A^2$ and $A^3$ is a monocyclic divalent aromatic radical and Y is a bridging radical in which one or two atoms separate $A^2$ from $A^3$.

11. A method according to claim 10 wherein the reaction is conducted in one step.

12. A method according to claim 10 wherein the reaction is conducted in two steps, the first being the preparation of a bischloroformate oligomer composition and the second being the conversion of said bischloroformate oligomer composition to a polycarbonate.

13. A method according to claim 12 wherein the alkyl hydroperoxide is introduced prior to the second step.

14. A method according to claim 13 wherein each of $A^2$ and $A^3$ is p-phenylene and Y is isopropylidene.

15. A method according to claim 14 wherein the polycarbonate is a homopolycarbonate.

* * * * *